US011942244B2

(12) United States Patent
Horton et al.

(10) Patent No.: US 11,942,244 B2
(45) Date of Patent: Mar. 26, 2024

(54) SURGE PROTECTION APPARATUS AND METHOD FOR SUBSTATION PROTECTIVE RELAYS

(71) Applicant: Electric Power Research Institute, Inc., Charlotte, NC (US)

(72) Inventors: Randy Horton, Alexandria, VA (US); Andrew John Phillips, Harrisburg, NC (US); Charles Perry, Louisville, TN (US)

(73) Assignee: Electric Power Research Institutem Inc., Charlotte, NC (US)

( * ) Notice: Subject to any disclaimer, the term of this patent is extended or adjusted under 35 U.S.C. 154(b) by 0 days.

(21) Appl. No.: 17/228,568

(22) Filed: Apr. 12, 2021

(65) Prior Publication Data

US 2022/0328216 A1 Oct. 13, 2022

(51) Int. Cl.
*H01C 7/12* (2006.01)
*H01C 1/02* (2006.01)

(52) U.S. Cl.
CPC ................ *H01C 7/12* (2013.01); *H01C 1/02* (2013.01)

(58) Field of Classification Search
CPC .................................. H01C 7/12; H01C 1/02
See application file for complete search history.

(56) References Cited

U.S. PATENT DOCUMENTS

| | | | | | |
|---|---|---|---|---|---|
| 4,835,650 | A * | 5/1989 | Epstein | H02H 9/04 | 361/111 |
| 6,411,486 | B1 * | 6/2002 | Doneghue | H01H 9/14 | 361/118 |
| 7,307,823 | B2 * | 12/2007 | Dabrowski | H04M 3/18 | 361/118 |
| 7,782,588 | B2 * | 8/2010 | Liao | H02H 9/044 | 361/119 |
| 8,107,208 | B2 * | 1/2012 | Hotchkiss | H02H 9/044 | 29/841 |
| 8,508,326 | B2 * | 8/2013 | Kang | H01C 7/102 | 338/21 |
| 9,450,410 | B2 * | 9/2016 | Moore | H02H 7/26 | |
| 2002/0048130 | A1 * | 4/2002 | Jakwani | H01C 7/12 | 361/117 |
| 2007/0201177 | A1 * | 8/2007 | Kladar | H02H 9/042 | 361/118 |
| 2012/0206848 | A1 * | 8/2012 | Gillespie | H02H 9/02 | 361/104 |

* cited by examiner

*Primary Examiner* — Kyung S Lee
(74) *Attorney, Agent, or Firm* — Trego, Hines & Ladenheim, PLLC; Brandon C. Trego; Jonathan M. Hines

(57) ABSTRACT

A surge protection apparatus is disclosed. The surge protection apparatus includes a housing; electronics contained in the housing; and a plurality of metal tabs electrically connected to the electronics, the metal tabs being configured to connect to a terminal block of a relay panel in a substation, the metal tabs electrically connecting the terminal block to the electronics to provide EMP surge protection to the relay panel.

18 Claims, 11 Drawing Sheets

SURGE PROTECTION APPARATUS AND METHOD FOR SUBSTATION PROTECTIVE RELAYS

BACKGROUND OF THE INVENTION

This invention relates generally to a surge protection apparatus and method, and more particularly to a terminal mounted electromagnetic pulse (EMP) transient voltage surge protection apparatus and method for substation protective relays.

A high-altitude detonation of a nuclear weapon can generate a large electromagnetic pulse (EMP), referred to as a high-altitude EMP (HEMP). HEMP is composed of three hazard fields that are denoted E1, E2, and E3. For purposes of clarity, the current discussion will be limited to E1 HEMP. The E1 component of HEMP is a rapid pulse of radio frequency electromagnetic energy that impacts any position on earth within line of sight of the high-altitude nuclear burst. The resulting electromagnetic plane wave that propagates to the earth's surface is generated by the interaction of the atmospheric gamma ray—generated Compton currents with the earth's magnetic field. This plane wave propagates to the earth's surface and couples to conductive lines, for example unshielded control/signal cables within an electric substation, and induces voltage and current transients (surges) that can damage connected electronic equipment such as digital protective relays (DPRs). An example of plane wave coupling to an arbitrary above ground cable that is terminated at each end by a lumped impedance is illustrated in FIG. 1. The voltage surges, shown in FIG. 2, can damage connected equipment such as digital protective relays. Thus, there is a need to mitigate these transients.

Presently available surge protection uses Metal Oxide Varistors (MOVs). These MOV devices are commercially available and have been used to protect equipment against lightning surges; however, MOV devices have not been used widely to protect electronic devices, such as protection and control equipment (e.g., DPRs) located in substations, from E1 HEMP surges. One MOV solution would be to use the MOV to shunt the voltage surge to ground before it propagates on to a connected device that is susceptible to voltage and current transients, FIG. 3.

However, there are many practical issues with using MOVs in substation applications. Some of these include: (1) connecting to the equipment in the appropriate location (this can be especially difficult in substation retrofit application), (2) providing a means of determining whether the MOVs have failed or the unit is operational, (3) grouping the MOVs in a modular sense for digital protective relay applications, and (4) ensuring that the MOVs and design are sufficient to provide protection against the very fast front transients that are associated with E1 HEMP.

Retrofitting an existing substation with presently available surge protection, if it existed for EMP surges, would be expensive and time consuming (i.e., requiring extended outages). In general, cables come from devices outside the substation control building and "land" on terminal blocks at the rear of cabinets, FIG. 4. Cables then go from these terminal blocks to the electronic devices that measure, protect, control and communicate with the grid. If the form factor of presently available lightning protection devices, e.g., DIN rail mounted and potentially in series with the present cables, were used it would require:

A whole new cable layout and cable landing design which accounted for the presence of the surge protection, its attachment and connection. An example of the back of a relay panel is provided FIG. 5. As shown in FIG. 5, connecting commercially-available surge protection devices would require a major design, testing and retrofitting effort. This would be expensive, and time consuming for existing substation control houses and require a new design approach for new substation control houses.

If the protective device contains series elements or is, in any way, connected in series with the signal or power cabling, it would need to be designed to withstand high levels of power frequency and lightning transient currents, making it expensive and bulky as well as require extra certification testing.

The form factor of available and applicable lightning surge protective devices are such that they protect one wire only. In the case of cables used in protective relay applications, the cables come in groups of 4 (or more), e.g., Phase a, Phase b, Phase c and neutral. To have individual surge protection devices (SPDs) for each cable would be bulky and expensive. In addition, multiple grounds would have to be wired which is time consuming, increases risk, and may increase the series inductance of the grounding path and, thus, reduce the level of protection that the device provides.

Thus, a surge protection apparatus and method that provides the appropriate level of surge protection while addressing the issues described above is needed.

BRIEF SUMMARY OF THE INVENTION

This need is addressed by providing a surge protection apparatus that can be used for E1 HEMP and retrofitted easily to terminal blocks presently used in substation control wiring applications.

According to an aspect of the technology described herein, a surge protection apparatus includes a housing; electronics contained in the housing; and a plurality of metal tabs electrically connected to the electronics, the metal tabs being configured to connect to a terminal block of a relay panel in a substation, the metal tabs electrically connecting the terminal block to the electronics to provide EMP surge protection to the relay panel According to another aspect of the technology described herein, a terminal mounted electromagnetic pulse (EMP) transient voltage surge protection apparatus includes a housing; electronics contained in the housing; and a plurality of metal tabs electrically connected to the electronics, the metal tabs being configured to connect to a terminal block of a relay panel in a substation, the metal tabs electrically connecting the terminal block to the electronics in parallel to provide EMP surge protection to the relay panel.

According to another aspect of the technology described herein, a method of protecting relay panels in a substation from electromagnetic pulse (EMP) transient voltages includes the steps of: providing a surge protection apparatus having: a housing; electronics contained in the housing; and a plurality of metal tabs electrically connected to the electronics, the metal tabs being configured to connect to a terminal block of a relay panel in a substation, the metal tabs electrically connecting the terminal block to the electronics to provide EMP surge protection to the relay panel; and electrically connecting the surge protection apparatus to the terminal block of the relay panel in the substation

BRIEF DESCRIPTION OF THE DRAWINGS

The invention may be best understood by reference to the following description taken in conjunction with the accompanying drawing figures, in which.

DETAILED DESCRIPTION OF THE INVENTION

Surge protection of devices (not substation electronics) exposed to E1 HEMP surges has in the past been mitigated with the use of powerline filters. These powerline filters are connected in series between the cable and the device and are designed to block the transient signal. Such powerline filters are used to protect equipment connected to AC power circuits inside shielded enclosures (e.g., a desktop computer) and were never designed to protect low-voltage signal wires that are connected to digital protective relays. Because of the nature of power system protection and control circuits, series connected devices are not preferred.

Figure 1:
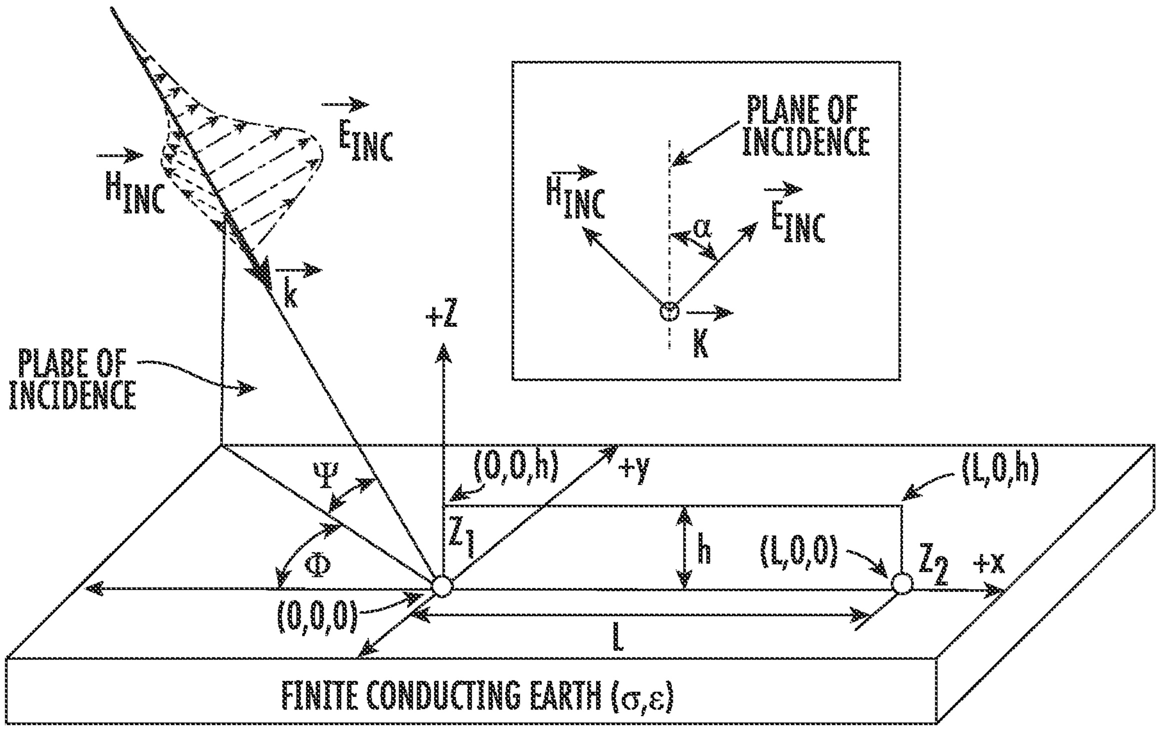
FIG. 1 shows an electromagnetic plane wave (E1 HEMP) coupling into an arbitrary conductor system, resulting in voltage and current transients.
Figure 2:
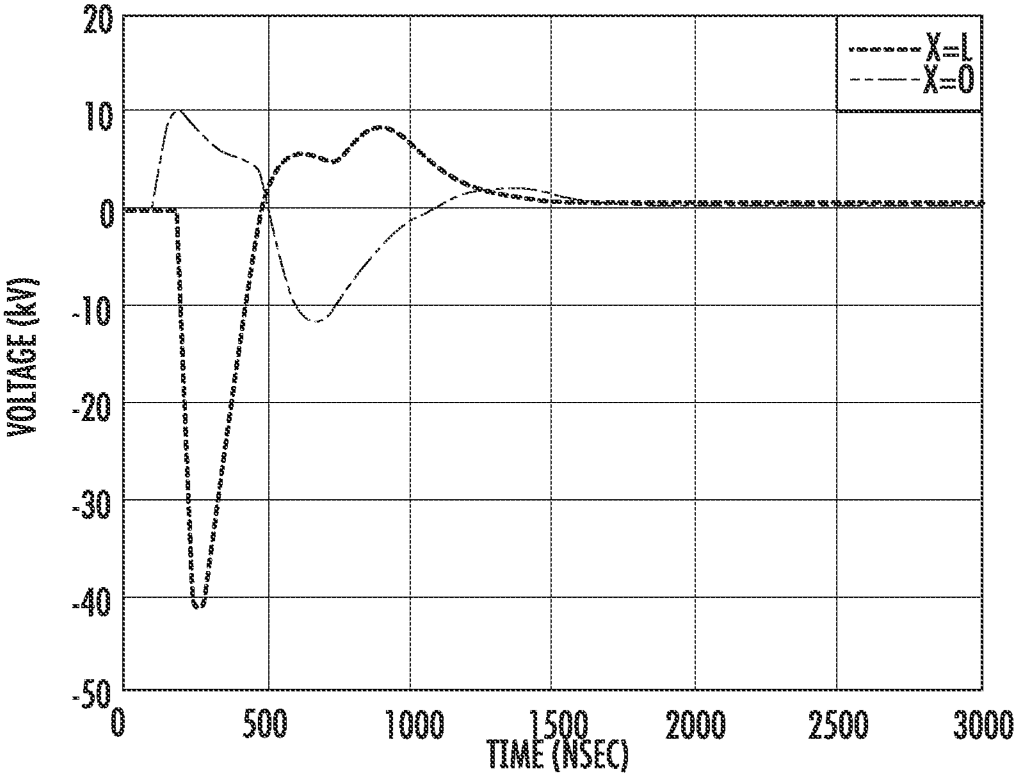
FIG. 2 shows example transient surge voltages generated by E1 HEMP.
Figure 3:
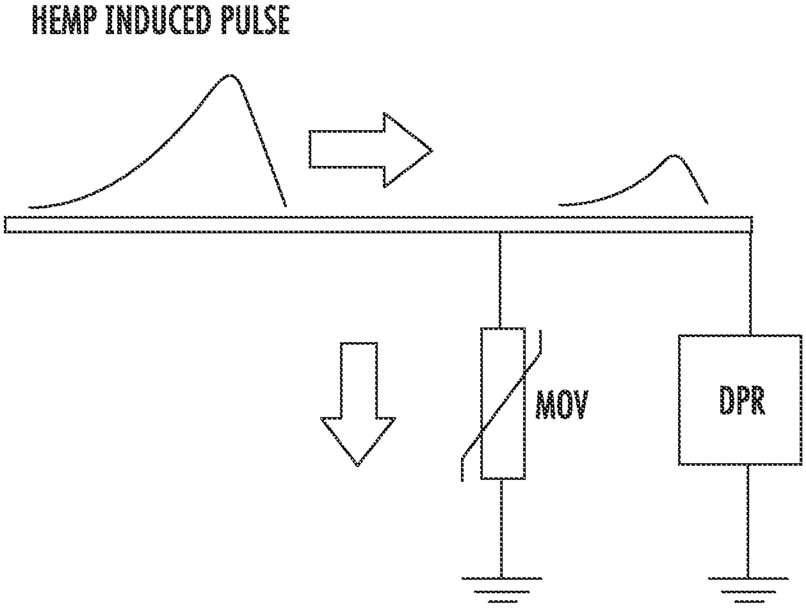
FIG. 3 illustrates MOV shunting of an incident voltage surge to ground.
Figure 4:
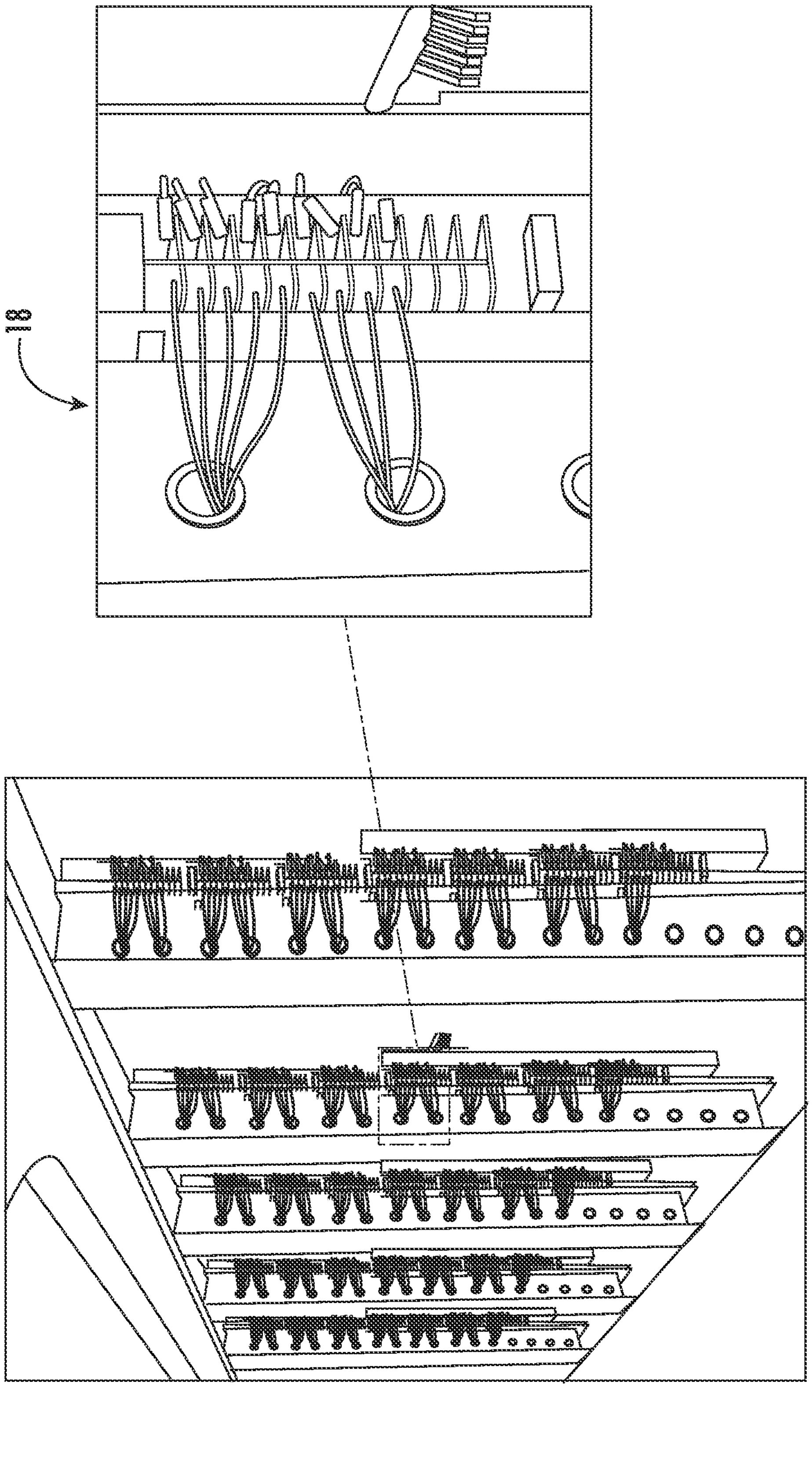
FIG. 4 shows a relay panel with terminal blocks where surge protection devices are needed.
Figure 5:
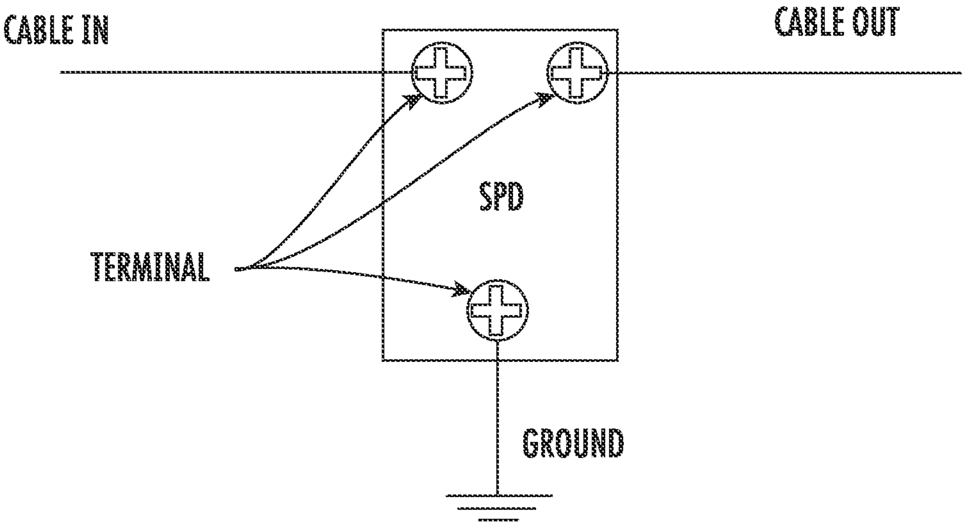
FIG. 5 shows an example of series connections associated with a surge protection device.
Figure 6:
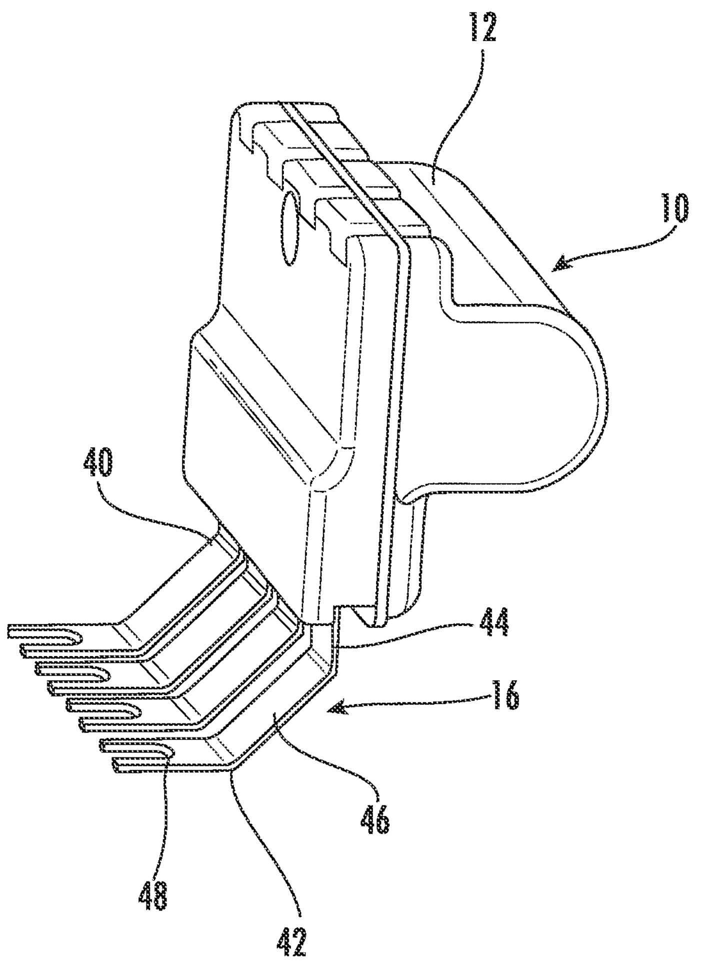
FIG. 6 shows a modular surge protection device according to an embodiment of the invention.
Figure 7:
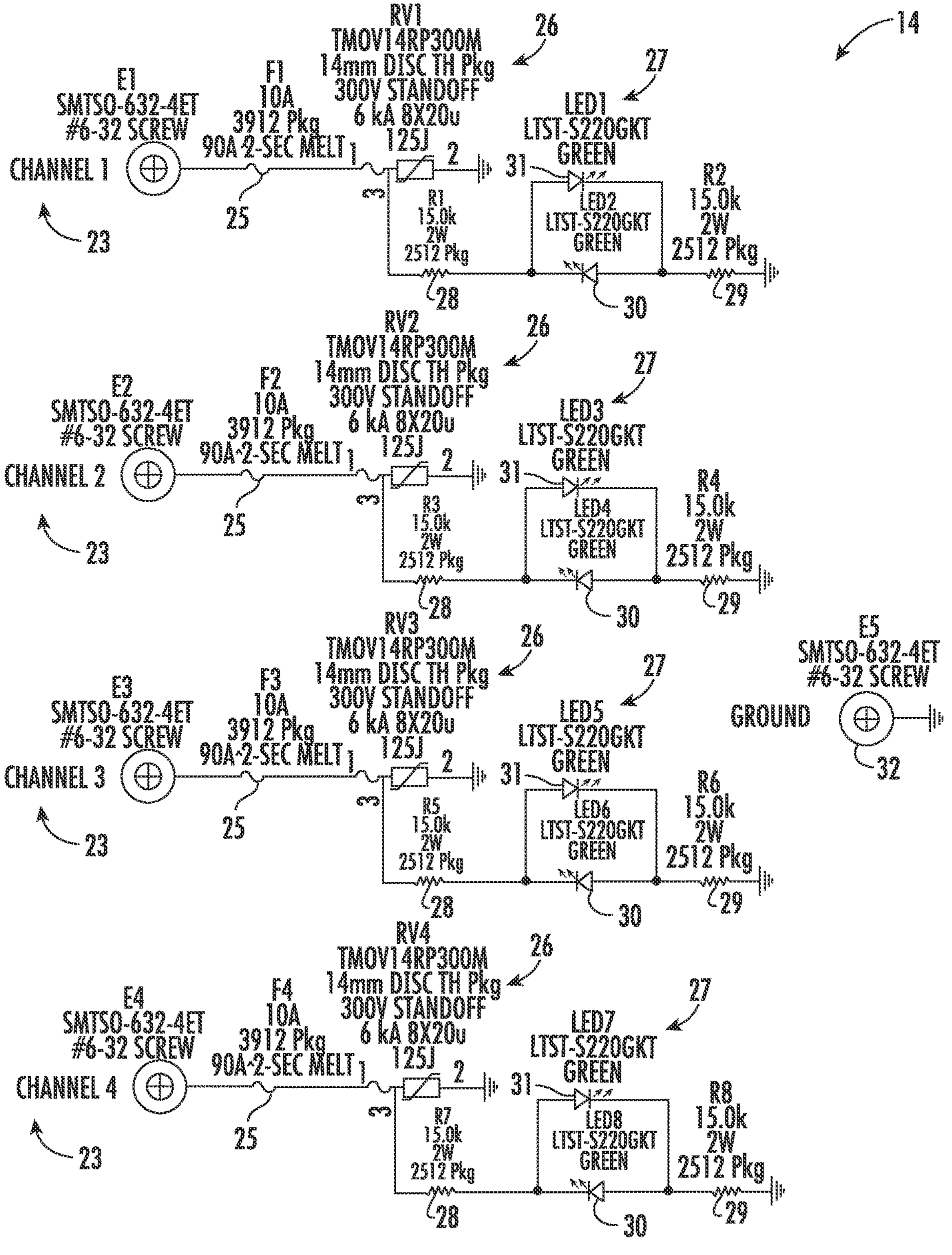
FIGS. 7-10 show electronics of the modular surge protection device of FIG. 6.
Figure 8:
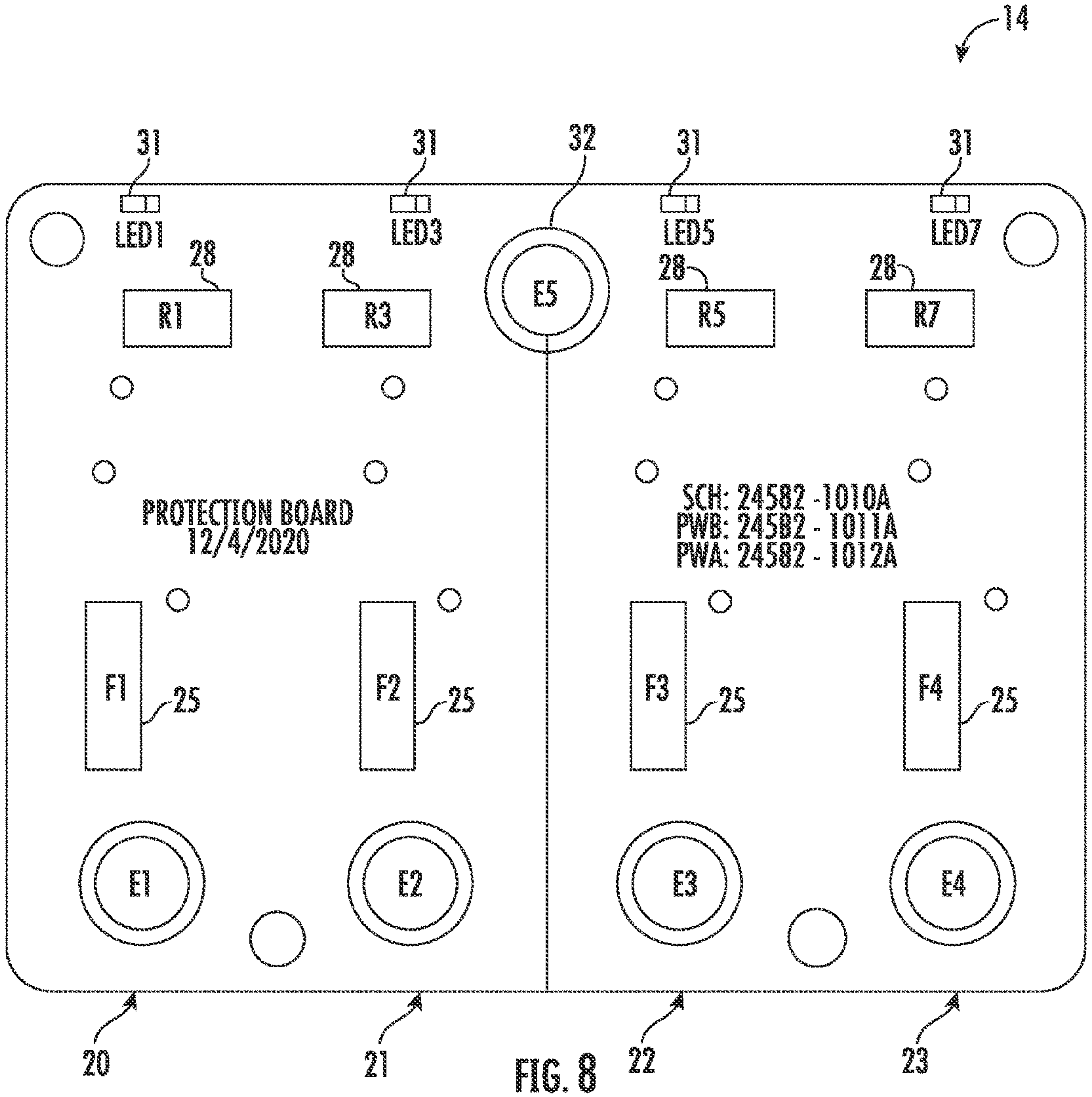
Figure 9:
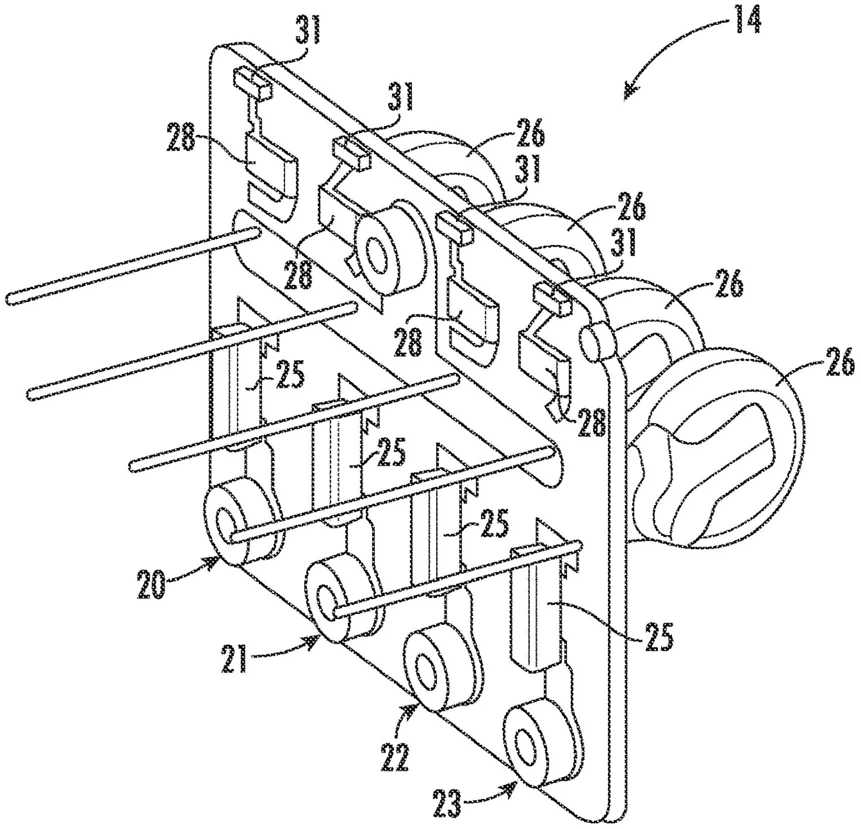
Figure 10:
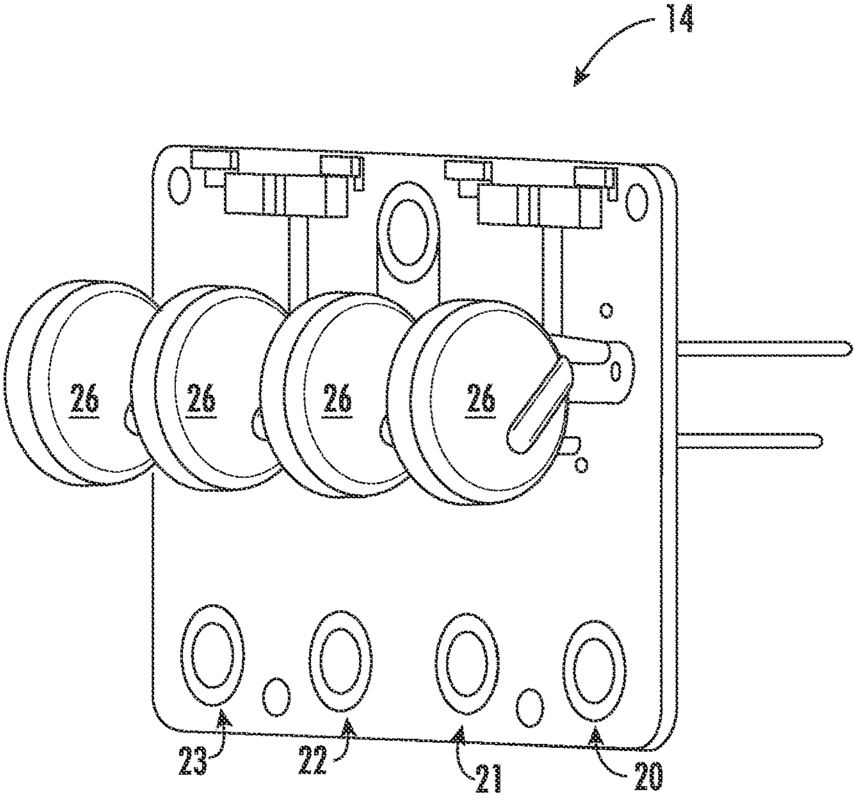

Referring to the drawings wherein identical reference numerals denote the same elements throughout the various views, FIGS. 6 and 7 illustrate a modular EMP surge protection device (E-SPD) 10. The E-SPD 10 includes a housing 12 housing and/or containing electronics 14 and a plurality of metal tabs 16 connected to the electronics 14 for connecting to a terminal block 18 (see FIG. 4) of a relay panel in a substation. The housing may be made of plastic or any other suitable material.

As shown in FIGS. 7-10, E-SPD 10 includes four channels 20-23. Each respective channel 20-23 has a fuse 25, an MOV with internal fuse 26, an LED circuit 27 having two resistors 28 and 29 and two LEDs 30 and 31 (green or other suitable color). There is also a grounding lug 32 that provides a ground path for the MOVs 26 and LED circuits 27. Each channel 20-23 is connected to a respective one of the tabs 16.

The MOVs 26 are used to shunt the incident voltage surge to ground. The fuses 25 are used to isolate the MOVs 26 from the connected circuit should they fail. Generally, the MOVs 26 fail shorted and so an MOV failure will create a short circuit to ground and could affect the operation of the protection and control system that it is connected to if the failed MOV is not automatically disconnected from the system. The LED circuit 27 is used to provide indication that the device is on-line and that the fuses 25 are not blown. When the LEDs 30 and 31 are lit, the system is operational, and when they are not, it indicates a problem has occurred.

Figure 11:
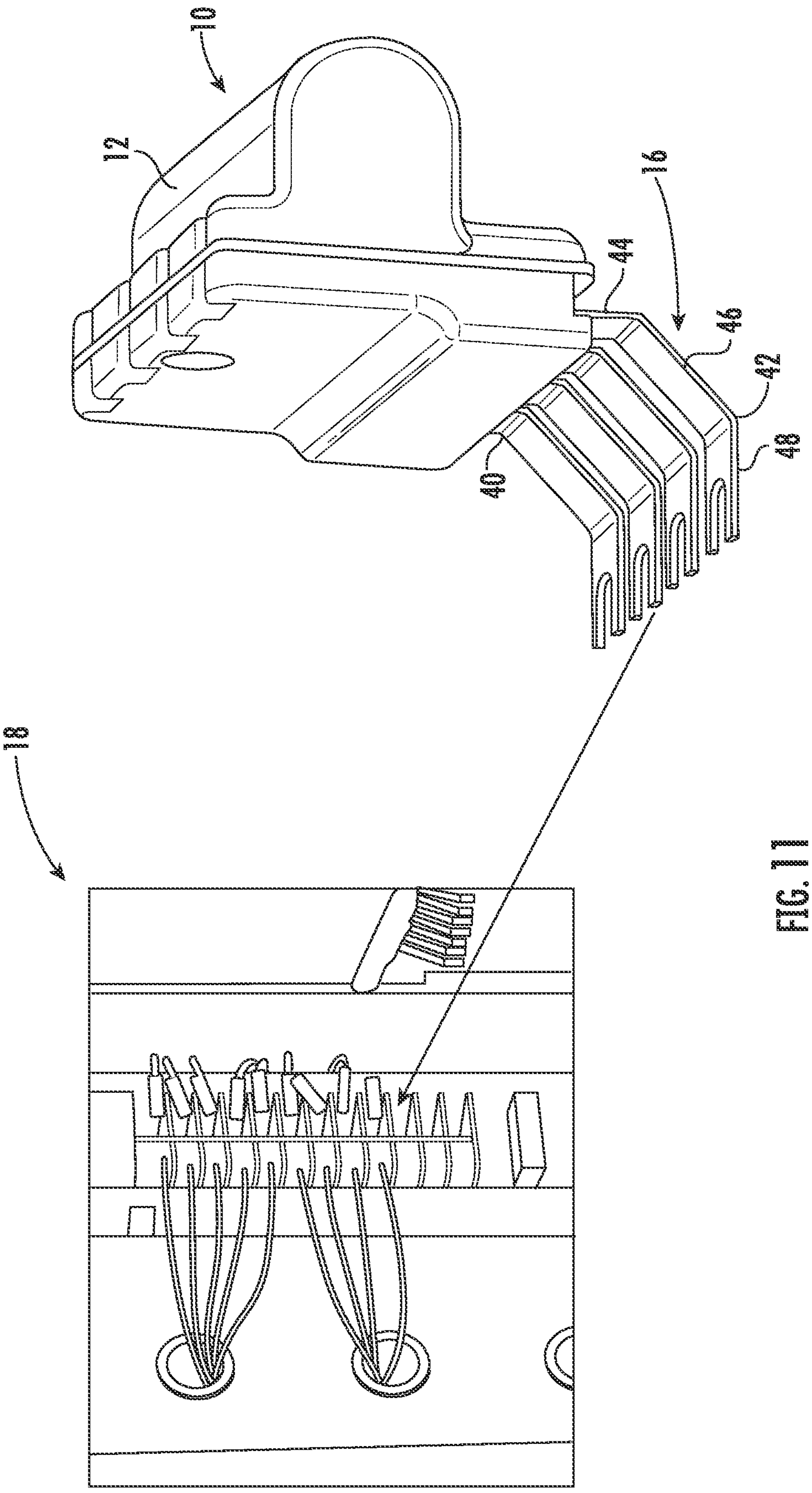
FIG. 11 shows the modular surge protection device of FIG. 6 being installed on a terminal block of the relay panel of FIG. 4.

The design of the E-SPD 10 allows the E-SPD 10 to be installed onto terminal blocks already used for substation control wiring applications, FIG. 11. The tabs 16 are specifically designed such that the E-SPD 10 can be installed by loosening existing terminal block screws, sliding the tabs 16 between the screws and the terminal block 18, and retightening the screws to secure the E-SPD 10 to the terminal block 18. This approach saves time by eliminating the need to modify the terminal block 18.

As shown, the tabs 16 are angled to allow the E-SPD 10 to be easily installed onto existing terminal blocks 18. For example, each of the tabs 16 include two bends 40 and 42 which divide each of the tabs 16 into three sections 44, 46, and 48. The bend 40 has an angle (section 44 relative to section 46) of approximately 43 degrees to about 47 degrees and more preferably of about 45 degrees. Bend 42 has an angle (section 46 relative to section 48) of approximately 45 degrees to about 47 degrees and more preferably of about 45 degrees. It should be appreciated that a single bend or other suitable number of bends may be used. Section 44 may have a length of about 0.6 cm to about 0.67 cm and more preferably about 0.635 cm; section 46 may have a length of about 0.98 cm to about 1.06 cm and more preferably about 1.02 cm; and section 48 may have a length of about 2.04 cm to about 2.12 cm and more preferably about 2.08 cm.

Figure 12:
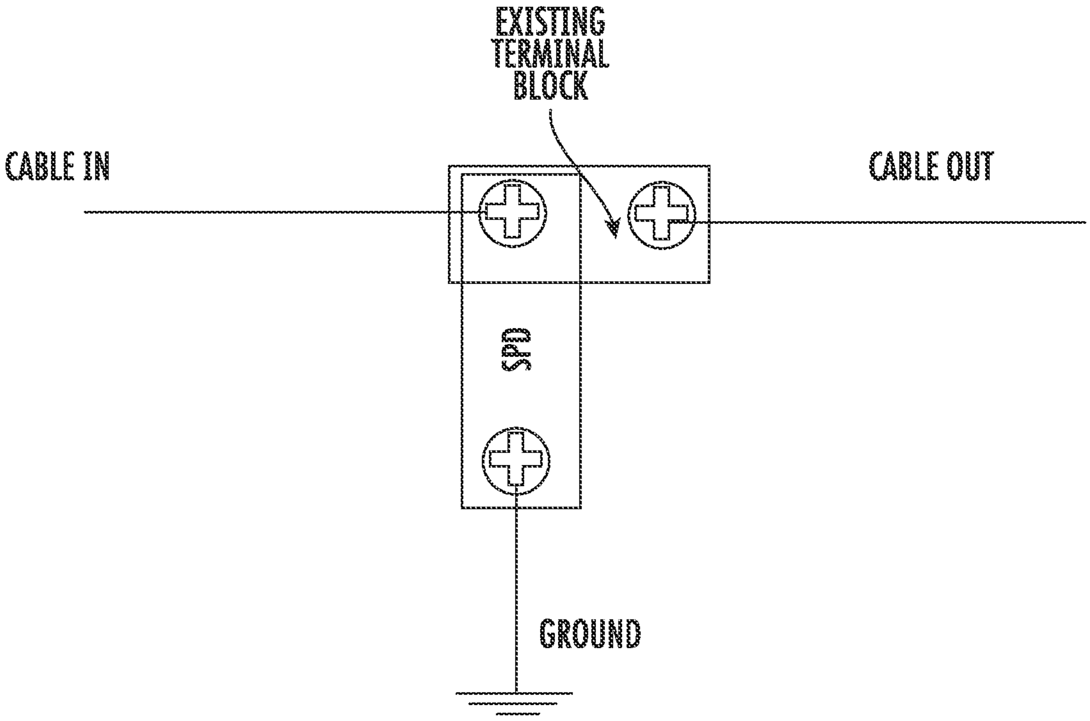
FIG. 12 shows a parallel connection of the modular surge protection device of FIG. 6.

As illustrated in FIG. 12, the E-SPD 10 is in parallel with the control wiring and, hence, it does not need to carry nominal load or fault currents that the wiring needs to withstand. The modularity of the E-SPD 10 allows multiple E-SPDs 10 to be connected together using the grounding lugs 32 of each E-SPD 10 so that multiple E-SPDs 10 can be used on a single terminal block 18. For example, 3 or 4 E-SPDs 10 may be connected together. Additionally, each of the connected multiple E-SPDs 10 may be designed for different voltage handling capabilities, for example, one might be designed for 120 volts and another for 69 volts. The grounding lug 32 on the circuit board is designed to be large so that it can accept a larger gauge wire, for example #10 AWG, to minimize the impedance to ground. For example, the ground lug 32 may be a 6-32 screw terminal (approximately 0.138 inches in diameter). This reduces the amount of surge voltage that propagates on to the protective device by reducing the transient voltage across the grounding system.

The current invention is advantageous because it can be connected directly to a terminal block of existing relay panels in a substation. This is in stark contrast to other devices that are DIN rail mounted or rack mounted which are not capable of being directly connected to the terminal block. Additionally, protection from fast front surges such as those generated by E1 HEMP is limited by longer ground leads, such 100's of centimeters. Mounting the surge protection devices directly to the terminal block minimizes ground lead length, for example 10's of centimeters, and improves protection.

The foregoing has described a surge protection apparatus and method. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A modular electromagnetic pulse (EMP) surge protection apparatus, comprising:

a housing;

electronics contained in the housing; and a plurality of metal tabs extending outwardly from the housing, each of the plurality of metal tabs being electrically connected to the electronics and configured to connect directly to a terminal block of a relay panel in a substation, the plurality of metal tabs electrically connecting the terminal block to the electronics to provide EMP surge protection to the relay panel;

wherein each of the plurality of metal tabs includes at least one bend to allow each of the plurality of metal tabs to be inserted between a fastener and the terminal block for direct connection thereto.

2. The surge protection apparatus of claim 1, wherein the electronics includes a plurality of channels, each respective channel being electrically connected to a respective one of the plurality of metal tabs.

3. The surge protection apparatus of claim 2, wherein each respective channel includes a metal oxide varistor (MOV).

4. The surge protection apparatus of claim 3, wherein the MOV includes an internal fuse.

5. The surge protection apparatus of claim 1, wherein the surge protection apparatus includes four metal tabs and four channels, each metal tab being electrically connected to a respective channel.

6. The surge protection apparatus of claim 2, wherein each respective channel includes a light emitting diode (LED) circuit to indicate that the surge protection apparatus is operational.

7. The surge protection apparatus of claim 6, wherein the LED circuit includes two resistors and two LEDs.

8. A terminal mounted electromagnetic pulse (EMP) transient voltage surge protection apparatus, comprising:

a housing;

electronics contained in the housing;

a plurality of metal tabs extending outwardly from the housing, each of the plurality of metal tabs being electrically connected to the electronics, the plurality of metal tabs being adapted to connect directly to a terminal block of a relay panel in a substation, the plurality of metal tabs electrically connecting the terminal block to the electronics in parallel to provide EMP surge protection to the relay panel; and wherein each of the plurality of metal tabs is directly connected to the terminal block by a fastener and wherein each of the plurality of metal tabs includes at least one bend to allow each of the plurality of metal tabs to be inserted between the fastener and the terminal block for direct connection thereto.

9. The surge protection apparatus of claim 8, wherein the electronics includes a plurality of channels, each respective channel being electrically connected to a respective one of the plurality of metal tabs.

10. The surge protection apparatus of claim 9, wherein each respective channel includes a metal oxide varistor (MOV).

11. The surge protection apparatus of claim 10, wherein the MOV includes an internal fuse.

12. The surge protection apparatus of claim 8, wherein the surge protection apparatus includes four metal tabs and four channels, each metal tab being electrically connected to a respective channel.

13. The surge protection apparatus of claim 9, wherein each respective channel includes a light emitting diode (LED) circuit to indicate that the surge protection apparatus is operational.

14. A method of protecting relay panels in a substation from electromagnetic pulse (EMP) transient voltages, comprising the steps of:

providing a surge protection apparatus having:

a housing;

electronics contained in the housing; and a plurality of metal tabs extending outwardly from the housing, each of the plurality of metal tabs being electrically connected to the electronics, the plurality of metal tabs being configured to connect directly to a terminal block of a relay panel in a substation, the plurality of metal tabs electrically connecting the terminal block to the electronics to provide EMP surge protection to the relay panel; and electrically connecting the surge protection apparatus to the terminal block of the relay panel in the substation by sliding each of the plurality of metal tabs between a respective screw and the terminal block and using the respective screw to secure each of the plurality of metal tabs to the terminal block.

15. The method of claim 14, further including the step of connecting multiple surge protection apparatuses together so that multiple surge protection devices may be connected to a single terminal block.

16. The method of claim 15, wherein the multiple surge protection apparatuses are connected together by connecting ground lugs of each of the multiple surge protection apparatuses together.

17. The method of claim 14, further including the step of connecting a second surge protection apparatus to the surge protection apparatus, the second surge protection apparatus having a voltage handling capacity different than the surge protection apparatus.

18. The method of claim 14, wherein the surge protection apparatus is electrically connected to the surge protection apparatus in parallel.

* * * * *